United States Patent Office 3,483,120
Patented Dec. 9, 1969

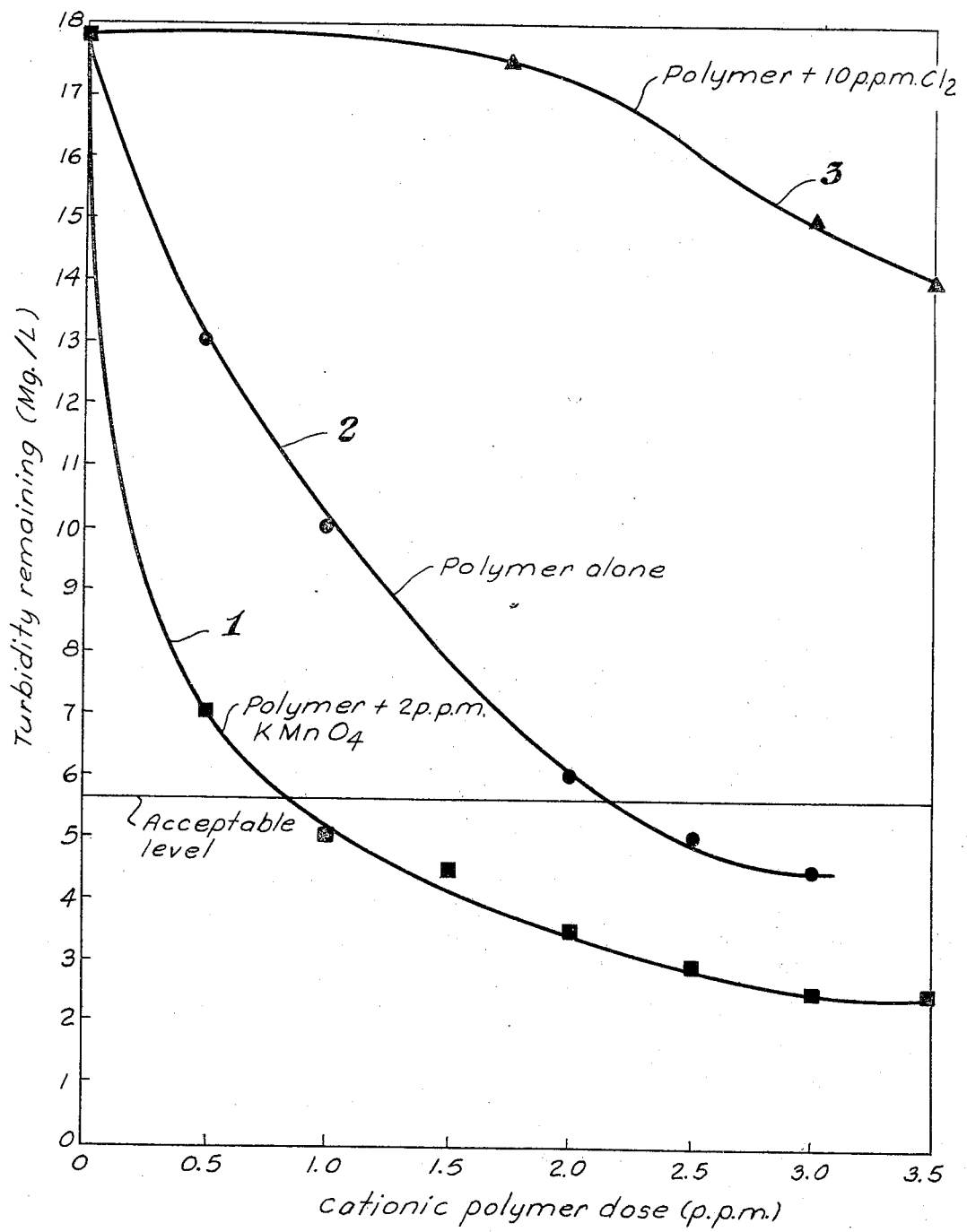

3,483,120
CLARIFICATION AND DISINFECTION OF WATER
Asa E. Hatch, Lake Jackson, Tex., assignor to The Dow Chemical Company, Midland, Mich., a corporation of Delaware
Filed Nov. 21, 1967, Ser. No. 684,817
Int. Cl. C02b 1/20, 1/34
U.S. Cl. 210—50                                5 Claims

ABSTRACT OF THE DISCLOSURE

Turbid water is simultaneously clarified and disinfected by treatment with alkali permanganate and a water-soluble, cationic polyelectrolyte flocculant. As compared to chlorine, which hinders the flocculation capability of cationic polyelectrolytes, the permanganate enhances flocculation results.

---

The instant invention concerns a novel process for the treatment of water, especially turbid water requiring disinfection. Alkali permanganates, though little used for the purpose, are known to be effective biocides in water. They are known, for instance, to be efficient algicides. They are also known as oxidants for organic contaminants in water. Although useful in treating higher concentrations of organic disperse phases, the permanganates are preferred for use in what is termed herein "turbid" water. Surface waters as obtained from rivers and lakes, and some dilute waste streams are such turbid waters.

In recent years, water-soluble, cationic polyelectrolyte flocculants have been increasingly used for separating disperse organic phases from aqueous media. Such polymers often perform well at dosages of less than 20 parts per million, based on the weight of the system treated.

It is sometimes desirable in the processing of water to effect both clarification by removing suspended solids and disinfection of the water. A disinfecting agent commonly used for this purpose is chlorine. When cationic polyelectrolytes are employed as flocculants in the presence of chlorine, the results have generally been unfavorable. The chlorine for some unknown reason interferes with the flocculation capabilities of the cationic polymer. Accordingly, chlorination has been employed in unit operations subsequent to flocculation.

It would be desirable, and it is an object of the instant invention to provide a novel process for the treatment of water in which clarification by flocculation and disinfection are accomplished in a single contact mixing zone. It is a further object to provide a process in which certain disinfectants and cationic flocculants are compatible. A still further object is to provide a process in which the disinfectant and flocculant conjointly provide more efficient solids separation.

In accordance with the instant invention, an improved process for the disinfection and clarification of turbid water comprises treating the water, under flocculating conditions, with a combination of an alkali metal permanganate, such as sodium or potassium permanganate, and a water-soluble cationic polyelectrolyte flocculant. By turbid water is meant any water dispersion in which there is some relatively small proportion of organic and/or inorganic suspended solids.

The flocculating conditions referred to above are well known to those skilled in the art. It is known for instance that the polymer should be uniformly dispersed throughout the system to be flocculated. This is usually accomplished by relatively severe agitation followed by slower agitation to promote the building of flocs Ultimately, if final solids separation is to be achieved by settling the flocculated solids, the treated system is maintained under quiescent conditions. Otherwise, the flocculated solids may be separated by any solids-liquid separatory technique including filtration, centrifugation and flotation.

Although dispersions of up to several thousand parts per million of suspended materials may be treated in accordance with the invention, the preferred embodiments of the invention will be applied to turbid waters in which the suspended organic or inorganic phase is less than about 500 parts per million based on total weight. Effective disinfection will depend in large measure upon the amount of organic contaminant to be treated but will generally be within the range from about 0.1 up to 20 parts per million by weight of the permanganate salt, based on the turbid water treated.

The cationic polyelectrolyte flocculant can be any of the known cationic polymers possessing capability as flocculants for aqueous dispersions of suspended solids. There are a great many of such flocculants. Among the better known cationic flocculants are the polyalkylenepolyamines, polyaminoalkyl acrylates, polyamino-N-alkyl acrylamides, polyvinylbenzyl ammonium halides, amineformaldehyde condensation resins, amino substituted polyamides. Although molecular weight is not critical, it is preferred that the cationic polyelectrolyte flocculants used have molecular weights of at least about 1000, preferably at least about 50,000. The effective dosages of the polymer, which will depend in part upon the molecular weight of the polymer and its chemical nature, will vary from as little as about 0.05 up to about 50 parts per million by weight, based on the system treated. With the more efficient, higher molecular weight cationic flocculants, the dose will be within the range from about 0.5 up to about 10 parts per million.

Exemplary of the cationic polyelectrolytes are cationic derivatives, ethers and esters of polysaccharides including for example the amino derivatives of starch set forth in U.S. 2,975,124 and U.S. 2,995,512. Another class of suitable cationic polyelectrolytes includes the amino alkyl esters and amino alkyl amides of polyacrylic materials as taught in U.S. 3,014,896. Particularly preferred for use in the instant invention are the higher molecular weight, hydrophilic, alkylene polyamines obtained by polymerizing lower alkylene polyamines with polyfunctional condensing agents. Examples of the alkylene polyamines are ethylenediamine, 1,2-propylenediamine, 1,3-propylenediamine, diethylenetriamine, triethylenetetramine, etc. Condensing agents include polyfunctional halohydrins such as epichlorohydrin and dihalohydrins. Other polyfunctional agents which can be condensed with the polyamines, include alklyene dihalides, formaldehyde and polybasic carboxylic acids. Other polyalkylene polyamines are obtained by the condensation of alkylene dihalides with ammonia.

In addition to the foregoing, numerous other cationic polyelectrolytes are known to the art including polyvinylpyridine, amino-substituted imides and amides derived from styrene-maleic acid copolymers, and melamine-formaldehyde and guanidine-formaldehyde condensation resins, polyvinyl amine and polyvinylbenzyl sulfonium halides.

The invention will be better understood by reference to the following examples. In the first series of operations, the mutual interaction of an alkali permanganate and a cationic polyelectrolyte flocculant is demonstrated in comparison to the flocculant used both alone and in the presence of chlorine. The series illustrates the unique compatibility of the cationic flocculant with the permanganate disinfectant. In a second series of examples, certain anionic polymers are shown to be relatively inefficient, as compared to cationic polymers, when employed conjunctively with the permanganate.

EXAMPLES 1–3

To a one-liter aliquot of turbid river water was added 2 parts per million by weight of potassium permanganate. This amount of the reagent previously had been determined to be necessary for disinfection of the water. After the treated water had been stirred at 125 r.p.m. in a Phipps and Bird Laboratory Flocculation Apparatus for 30 seconds, 3 parts per million by weight of a water-soluble, polyalkylenepolyamine was added as a one percent by weight water solution. This polymer was a condensation product of ethylene dichloride and a polyalkylenepolyamine. It was characterized by a viscosity of 25,000 centipoises for a 37 percent by weight aqueous solution at pH 9.5, as measured with a Brookfield Viscometer, using a No. 3 spindle at 6 r.p.m. It was believed to have an average molecular weight within the range of about 50,000 to 100,000.

After addition of the polymer, stirring was continued at a rate of 125 r.p.m. for 5 minutes and then slowed to 40 r.p.m. for an additional 10 minutes. The stirrer was then turned off and the flocs allowed to settle for 5 minutes. A sample of liquid was obtained from 1 inch below the surface of the treated water and measured for residual turbidity. This measurement was made with a Hellige turbidimeter.

The above procedure was repeated on a second aliquot of river water except that the potassium permanganate was replaced by 10 parts per million by weight of chlorine supplied to the water system as a one percent aqueous solution. In a third run the cationic polyelectrolyte was employed as the sole additive.

The foregoing operations were repeated utilizing varying doses of the polymer. From this data were obtained the flocculation curves depicted in the figure of the accompanying drawing. In the drawing, curve No. 1 illustrates the conjoint use of the cationic polyelectrolyte with 2 parts per million of potassium permanganate. Curve No. 2 illustrates the use of the polymer alone and curve No. 3 conjoint use of the polymer with chlorine as the disinfectant. The unique interaction of the permanganate and the polymer is clearly evident. The acceptable level of turbidity is also indicated in the figure for reference.

EXAMPLES 4–8

In a further series of operations, the cationic polymer (PAPA) employed in the above examples and a copolymer of dimethylaminoethyl methacrylamide and acrylamide (DMA Am) were compared to three anionic high molecular weight polyelectrolyte flocculants, all being used conjunctively with 2 parts per million by weight of potassium permanganate, for the purpose of simultaneous water clarification and disinfection. The copolymer contained 20 mole percent of the aminoalkyl amide and 80 mole percent of acrylamide. It was characterized by a molecular weight greater than 1 million, as represented by a viscosity of 3180 centipoises in a 1 percent solution measured at 22° C. with a Brookfield Viscometer using a No. 3 spindle at 6 r.p.m. The anionic polymers tested were, a polyacrylamide (PAm) of about 1 million molecular weight with 4 to 8 percent of the amide groups hydrolyzed to sodium carboxylate groups, a copolymer of 60 mole percent acrylamide and 40 mole percent sodium acrylate (A-Am) of a molecular weight greater than about 6 million, and sodium polystyrene sulfonate (SPSS) of a molecular weight greater than about 6 million.

The flocculation and clarification results were obtained in a manner similar to the procedure described in the above examples. The results are set forth in the following table.

TABLE

| Flocculant | Turbidity remaining (mg./l.) [1] (polymer dose (p.p.m.)) | | | | |
|---|---|---|---|---|---|
| | 0.1 | 0.5 | 1.0 | 2.0 | 4.0 |
| Cationic: | | | | | |
| PAPA | 30 | 15 | 10 | 8 | 4 |
| DMA Am | 30 | 20 | 15 | 10 | 10 |
| Anionic: | | | | | |
| PAm | 30 | 30 | 35 | 28 | 30 |
| A-Am | 30 | 30 | 30 | 25 | 25 |
| SPSS | 30 | 30 | 25 | 25 | 25 |

[1] Milligrams per liter.

The foregoing illustrates the conjoint effectiveness of the permanganate with the cationic polyelectrolytes as compared to anionic flocculants. Permanganate used alone at various doses ranging from 2 to 10 parts per million produced turbidity ratings within the range from 35 to 20 milligrams per liter.

Essentially comparable results are achieved by substituting the foregoing examples for the cationic polyelectrolytes there described, polyethylenimine, homopolymers and copolymers of dimethylaminoethyl acrylate, polyvinylpyridine, formaldehyde-guanidine condensation resins, and polyvinylbenzyltrimethyl ammonium chloride. In general, any water-soluble, cationic polyelectrolyte possessing a flocculation capability for dispersing solid phases in water may be utilized to achieve advantages of the instant invention.

What is claimed is:

1. A method for treating turbid water which consists of incorporating into the water, without previous addition of any coagulating or flocculating agent and under flocculating conditions, an alkali permanganate and a water-soluble polymeric cationic polyelectrolyte flocculant, said permanganate being dosed at a predetermined effective disinfecting amount in the range from about 0.1 to about 20.0 parts per million by weight and said polyelectrolyte being dosed at about 0.1 to about 50.0 parts per million by weight, based on the turbid water treated.

2. A method as in claim 1 and including the additional step of separating the flocculated solids.

3. A method as in claim 1 wherein the turbid water contains less than about 500 parts per million by weight of dispersed solids.

4. A method as in claim 1 wherein the permanganate is potassium permanganate.

5. A method as in claim 1 wherein the cationic water-soluble polyelectrolyte is a water-soluble polyalkylenepolyamine.

References Cited

UNITED STATES PATENTS

| 1,088,063 | 2/1914 | Drechsler | 210—50 X |
| 1,094,731 | 4/1914 | Linden | 210—50 |
| 3,142,638 | 7/1964 | Blaisdell et al. | 210—52 |
| 3,171,800 | 3/1965 | Rice et al. | 210—52 |

FOREIGN PATENTS

| 826,770 | 1/1960 | Great Britain. |
| 1,045,628 | 11/1953 | France. |

OTHER REFERENCES

Hudson, H. E., et al.: High-Quality Water, etc., Jour. Awwa, vol. 54, October 1962, pp. 1265–1272.

MICHAEL E. ROGERS, Primary Examiner.

U.S. Cl. X.R.

210—51, 64